(12) United States Patent
Ma et al.

(10) Patent No.: US 9,684,732 B2
(45) Date of Patent: Jun. 20, 2017

(54) CREATING A SERVICE MASHUP INSTANCE

(75) Inventors: Chun E. Ma, BeiJing (CN); Xin Sheng Mao, BeiJing (CN); Li Yi, BeiJing (CN); Jun Zhang, BeiJing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1481 days.

(21) Appl. No.: 12/948,635

(22) Filed: Nov. 17, 2010

(65) Prior Publication Data
US 2011/0131194 A1 Jun. 2, 2011

(30) Foreign Application Priority Data
Nov. 30, 2009 (CN) .......................... 2009 1 0247133

(51) Int. Cl.
*G06F 17/30* (2006.01)
(52) U.S. Cl.
CPC .............................. *G06F 17/30899* (2013.01)
(58) Field of Classification Search
CPC ........... G06F 17/3012; G06F 17/30292; G06F 3/048; G06F 3/0484
USPC .......... 707/999.005, 705, 756, 783; 715/762, 715/738, 744
See application file for complete search history.

(56) References Cited

U.S. PATENT DOCUMENTS

| | | |
|---|---|---|
| 8,103,680 B2 * | 1/2012 | Khuti et al. .................. 707/751 |
| 2007/0106649 A1 | 5/2007 | Moore |
| 2007/0106650 A1 | 5/2007 | Moore |
| 2008/0222599 A1 * | 9/2008 | Nathan et al. ................ 717/107 |
| 2008/0244416 A1 * | 10/2008 | Dumant et al. ............... 715/744 |
| 2009/0063862 A1 | 3/2009 | Yun |
| 2009/0100407 A1 | 4/2009 | Bouillet et al. |
| 2009/0138509 A1 | 5/2009 | Hind et al. |
| 2009/0150806 A1 * | 6/2009 | Evje et al. ..................... 715/762 |
| 2009/0204594 A1 | 8/2009 | Akkiraju et al. |

(Continued)

FOREIGN PATENT DOCUMENTS

| | | |
|---|---|---|
| CN | 101405734 A | 4/2009 |
| CN | 101488151 A | 7/2009 |

OTHER PUBLICATIONS

Lu et al, sMASH: Semantic-Based Mashup Navigation for Data API Network, URL: http://www2009.org/proceedings/pdf/p1133.pdf, Thursday Apr. 23, 2009 Madrid, 2 pages.

(Continued)

*Primary Examiner* — Monica Pyo
(74) *Attorney, Agent, or Firm* — Steven L. Nichols; Fabian VanCott

(57) ABSTRACT

A method for creating a service mashup instance comprises recording at least two services being selected by a user during an exploration procedure, obtaining a relationship between the at least two services, and generating the service mashup instance based on the relationship. Additionally, a method of using content retrieved from external data sources to create a service based on that content comprises, with a browser application, recording at least two services being selected by a user during an exploration procedure, analyzing the relationship between the at least two services selected, generating the service mashup instance based on the relationship, and storing the relationship between the at least two services in a repository.

13 Claims, 8 Drawing Sheets

(56) References Cited

U.S. PATENT DOCUMENTS

2009/0210481 A1 8/2009 Fletcher et al.
2009/0259628 A1 10/2009 Farrell et al.

OTHER PUBLICATIONS

McDonald, Paul, Mashups Made Easy, URL:http://googlemashupeditor.blogspot.com/2007/05/mashups-made-easy.html, May 30, 2007, 3 pages.
Satterfield, Brian, Mashups: An Easy, Free Way to Create Custom Web Apps, URL:http://www.techsoup.org/learningcenter/webbuilding/archives/page9338.cfm, Sep. 8, 2006, 3 pages.
Intalio, The Enterprise Cloud Company, Enterprise Mashup Server, URL:http://www.intalio.com/products/crm/mashup/, 2009, 2 pages.
IBM Mashup Center, Enterprise Mashups Delivering Quick Business Applications and ROI, URL:.http://www-01.ibm.com/software/info/mashup-center/, 2009, 3 pages.
Chen et al., Research and Application of Mashup based on REST-style, School of Information Science & Technology, SWJTU, Chengdu 610031, China, Oct. 31, 2008.

\* cited by examiner

CREATING A SERVICE MASHUP INSTANCE

RELATED APPLICATION

Pursuant to 35 U.S.C. §119(b) and 37 C.F.R. §1.55(a), the present application corresponds to and claims the priority of Chinese Patent Application No. 200910247133.8 filed on Nov. 30, 2009, the disclosure of which is incorporated herein by the reference in its entirety.

BACKGROUND

The present application relates to the field of data processing and, more specifically, to a method, apparatus, and related computer program product for creating a service mashup instance based on a user's exploration procedure.

With the development of computer technology, the World Wide Web has increasingly become a programmable platform where users may combine various Web-based, lightweight Web services (such as a widget, feed, and RESTful API) provided via the Internet, in order to form service combinations that are customized according to the users' own demands. A Web service is a software system designed to support interoperable machine-to-machine interaction over a network. Web services are usually composed of application programming interfaces (APIs) that execute, through a network, service requests as submitted by clients.

As Web services become increasingly diversified and users' self-service awareness increases, users may no longer be satisfied with stereotyped services provided to the public by various Web service providers. Instead, users may want to select a number of desired services from the myriad of services provided by respective Web service providers and further have the option to combine selected services into a single application instance according to their own desires. For example, a user may desire to combine "book services" (e.g., GOOGLE BOOK®, AMAZON BOOK®, and DOUBAN BOOK®) provided by different service providers into one application instance, so as to quickly obtain prices, comments, or other related information regarding a certain book. For another example, stock investors may wish to simultaneously view, in one application instance, timeline information, stock prices, or enterprise information related to stocks that the user may have purchased where this information is available from different service providers.

A technique named "mashup" is a popular method for combining various desired services into one instance. The "mashup" refers to a network application mode in which a plurality of material sources or functions on a network are integrated to realize new services.

Commonly seen mashups usually acquire materials or functions from desired websites for the mashups such as books, maps, news, among others. These services may be provided by companies such as GOOGLE®, DOUBAN®, AMAZON®, EBAY®, YAHOO®, among others, by means of a set of open application programming interfaces. Service mashup instances are created by using existing mashup tools.

BRIEF SUMMARY

The present application discloses a method for creating a service mashup instance that includes recording at least two services being selected by a user during an exploration procedure, obtaining a relationship between the at least two services, and generating the service mashup instance based on the relationship.

Additionally, the present application discloses an apparatus for creating a service mashup instance that includes a browser that records at least two services being selected by a user during an exploration procedure, an analysis component that obtains a relationship between the at least two services, and a generation component that generates the service mashup instance based on the relationship.

Still further, the present application discloses a method of using content retrieved from external data sources to create a service based on that content, in which the method includes, with a browser application, recording at least two services being selected by a user during an exploration procedure, analyzing the relationship between the at least two services selected, generating the service mashup instance based on the relationship, and storing the relationship between the at least two services in a repository.

The present application further discloses an apparatus for using content retrieved from external data sources to create a separate and distinct service including a browser application that records at least two services being selected by a user during an exploration procedure, an analysis component that analyzes the relationship between the at least two services selected, a generation component that generates the service mashup instance based on the relationship, and a repository that stores the relationship between the at least two services in a repository.

Even further, the present application discloses a computer program product for creating a service mashup instance; the computer program product comprising a computer usable storage medium comprising computer usable program code embodied therewith, the computer usable program code comprising computer usable program code configured to record at least two services being selected by a user during an exploration procedure, computer usable program code configured to obtain a relationship between the at least two services, and computer usable program code configured to generate the service mashup instance based on the relationship.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
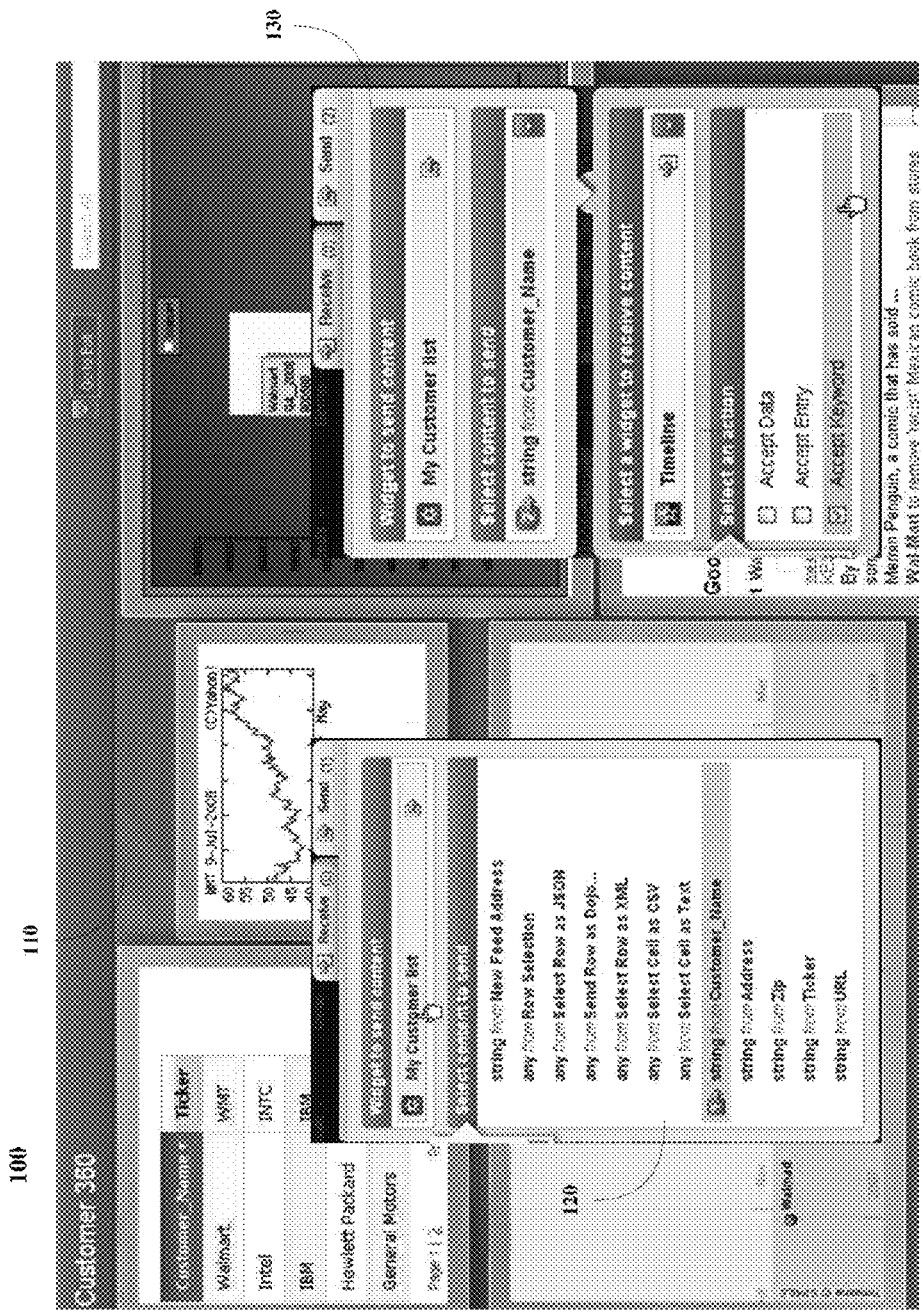
FIG. 1 is a schematic illustration of an operation interface for creating a service mashup instance in the prior art.

The present specification discloses a method, system and computer program product for creating service mashup instances based on user exploration procedure. Accordingly, the user only needs to browse and select desired services, and a system then automatically analyzes and creates a user-customized service mashup instance and recommends to the user common services for mashup creation. In this way, the technical threshold for achieving service mashups is greatly reduced at the user level.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, that execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions/acts specified in the flowchart and/or block diagram block or blocks.

To create a service mashup instance, one option may be to find the relationship among a plurality of services to be mashed up, for example, how to correlate two or more services. Hereinafter, the relationship among services is explained by way of two specific examples. One example may consist of a user seeking to create a stock information mashup instance. Another example may consist of a user seeking to create a book service mashup instance. These two specific examples will be discussed below. However, the principles set forth in the present specification may extend equally to any alternative scenario where a user may desire to create any type of service mashup instance.

In the first example, for a user who desires to create a stock information service mashup instance, the user may have found two services through the Internet such as Service 1 configured to provide client stock code and Service 2 configured to provide a stock quote curve. The customer data (i.e. input data) and provided data of the two services associated with this example are shown in Table 1 respectively.

TABLE 1

| Service Name | Customer Data | Provided Data |
| --- | --- | --- |
| Service 1 | Client Name | Stock Code |
| Service 2 | Stock Code | Stock Quote Curve |

Without a mashup, if the user hopes to complete a query regarding the stock quote curve of a certain client, the user will input the client name into Service 1 and acquire the stock code of the client from provided data of Service 1. Subsequently, when the user inputs the acquired stock code into Service 2, Service 2 outputs the stock quote curve. As can be seen from Table 1, the stock code data provided by the user to Service 1 is the customer data of Service 2. Such a relationship, called a "Data Correlation" relationship, will be explained in more detail below.

In the second example briefly mentioned above, a user who desires to create a book service mashup instance may want to specifically search three book services, for example, GOOGLE BOOK®, AMAZON BOOK®, and DOUBAN BOOK®, for a specific book (e.g., "Harry Potter"), analyze the information provided on each service, and compare that information provided by the three service providers. Therefore, without mashup, the user may be required to input "Harry Potter" into a corresponding page of each of the three services. The keywords input into the three services are the same as one another (i.e., "Harry Potter"). This is also a specific kind of relationship among services that is called a "Parameters sameAs" relationship.

In the prior art, it is a time-consuming and complex procedure to analyze and find the relationship among services to be mashed up. Reference is made to FIG. 1, which schematically illustrates an operation interface (100) for creating a mashup instance in the prior art. A main operation interface for creating a stock information mashup instance is illustrated in an interface (110). An interface (120) for selecting source widgets and source events is overlappingly displayed on the left side of the interface (110), and an interface (130) for selecting target widgets and target events is overlappingly displayed on the right side of the interface (110).

In the example as illustrated in FIG. 1, the user may be required to know programming details of the target services and source services to be mashed up. The user may also be required to manually analyze and select, for example, from the interface (120), content for which a mapping relationship needs to be created, and implement a correlation procedure via the target widget and target event interface as illustrated in the interface (130). The prior art procedure of seeking the relationship among services to be mashed up is complicated, and the user must know how to manually analyze the relationship among customer data/provided data between source services and target services as well as know detailed parameters of interfaces provided by the respective Web services. Still further, this procedure establishes data correlations by manual designation.

As used in the present specification and in the appended claims, the term "metadata" or "metadata of services" is meant to be understood broadly as a generic term for describing service-related information. For example, the related information may include the name of a service, general functional description of a service, data provided by a service, parameters consumed by a service, amongst others. Additionally, as used in the present specification and in the appended claims, the term "exploration procedure" is meant to be understood broadly as any procedure in which a user browses or searches various services.

Still further, as used in the present specification and in the appended claims, the term "navigation path" is meant to be understood broadly as any data structure that stores services browsed or searched by a user and related information, such as metadata of services, during an exploration procedure. Even further, as used in the present specification and in the appended claims, the term "relationship" is meant to be understood broadly as any relationship among services to be mashed up, such as the relationship among services as described in the foregoing examples.

Although various relationships may exist among a variety of services, those similar to the examples given here can be classified as "data correlation relationship" and a "parameters sameAs relationship." Therefore, as used in the present specification and in the appended claims, the term "data correlation relationship" is meant to be understood broadly as the data mapping relationship among provided data of two services. For example, a "data correlation relationship" may provide data which supplies some information regarding a search item or may also be the relationship between provided data of one service and customer data of other services. For example, and by way of illustration only, "data correlation relationship" may be the data mapping relationship among provided data of the two services in Table 1. Likewise, as used in the present specification and in the appended claims, the term "parameters sameAs relationship" is meant to be understood broadly as any relationship indicating that customer data of two services has the same data type. For example, and by way of illustration only, "parameters sameAs relationship" may be similar to the relationship created above with the same data type in the book service mashup example.

Even further, as used in the present specification and in the appended claims, the term "mashup template" is meant to be understood broadly as any template corresponding to the relationship among services, including a Data Correlation Relationship template and a Parameters sameAs template. In the exemplary embodiments of the present invention, a service mashup instance may be created by automatically analyzing the relationship among services and selecting a corresponding template based on the relationship. The template according to the embodiments of the present invention need not be a traditional display template that represents the layout relationship among respective service interfaces, but instead may be a template that represents the data flow relationship of data correlations among respective services. After a service mashup instance has been generated based on the template, the user may further adjust the layout of each service interface, such as its position and size. A detailed description is presented below to the specific implementation procedure of various embodiments with reference to FIGS. 2-5.

Figure 2:
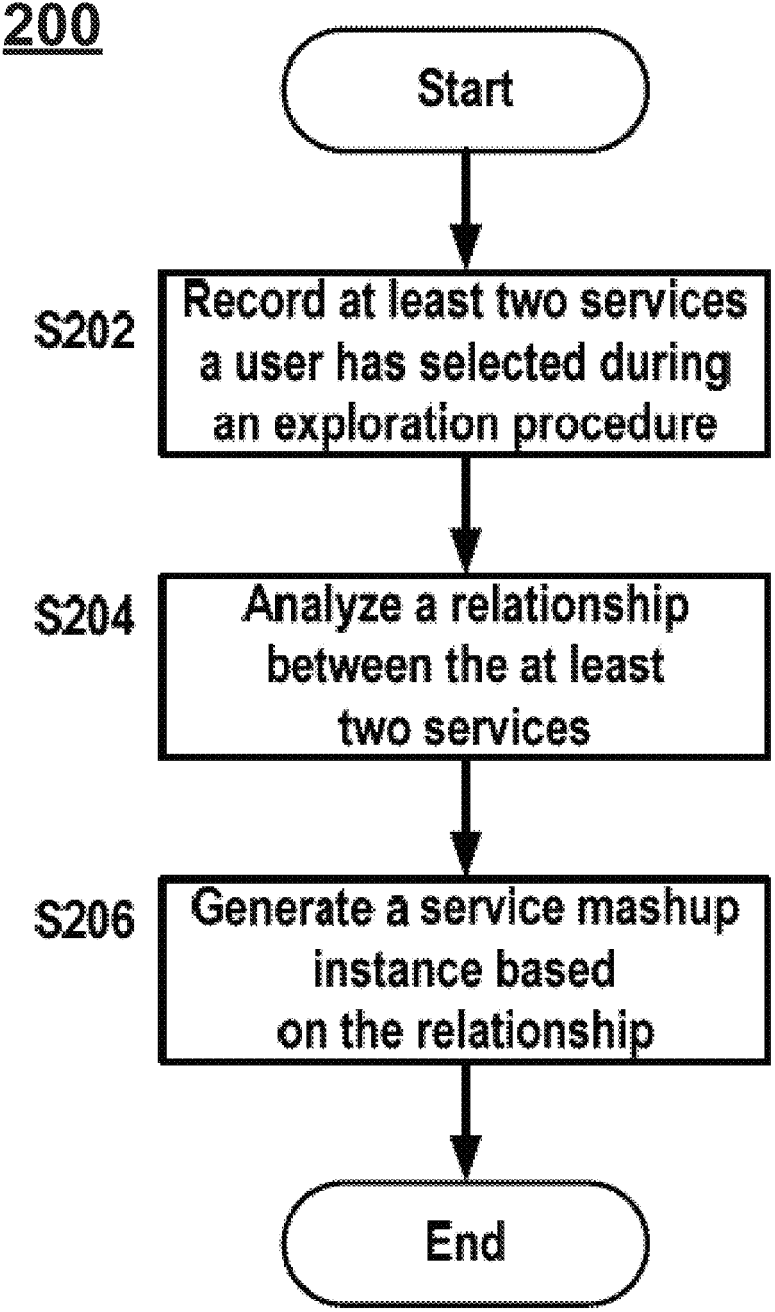
FIG. 2 is a flowchart showing an illustrative method for creating a service mashup instance, according to one exemplary embodiment of principles described herein.

FIG. 2 schematically illustrates a flowchart (200) of a method for creating a service mashup instance according to one illustrative embodiment of the present invention. As illustrated in FIG. 2, the method in this embodiment starts with recording (S202) at least two services selected by the user during an exploration procedure. During the exploration procedure, the user may access a plurality of services through browsing or searching. The user may select services desired for mashup creation from a plurality of services being accessed.

The relationship between the at least two services is analyzed (S204), and the service mashup instance is generated (S206) based on the relationship. FIG. 2 illustrates only one embodiment according to the present invention and there may be various embodiments. For example, in other embodiments a system may automatically record information related to services that the user has accessed, e.g., in a navigation path, and then record which one of the plurality of services the user has selected for mashup creation.

Figure 3:
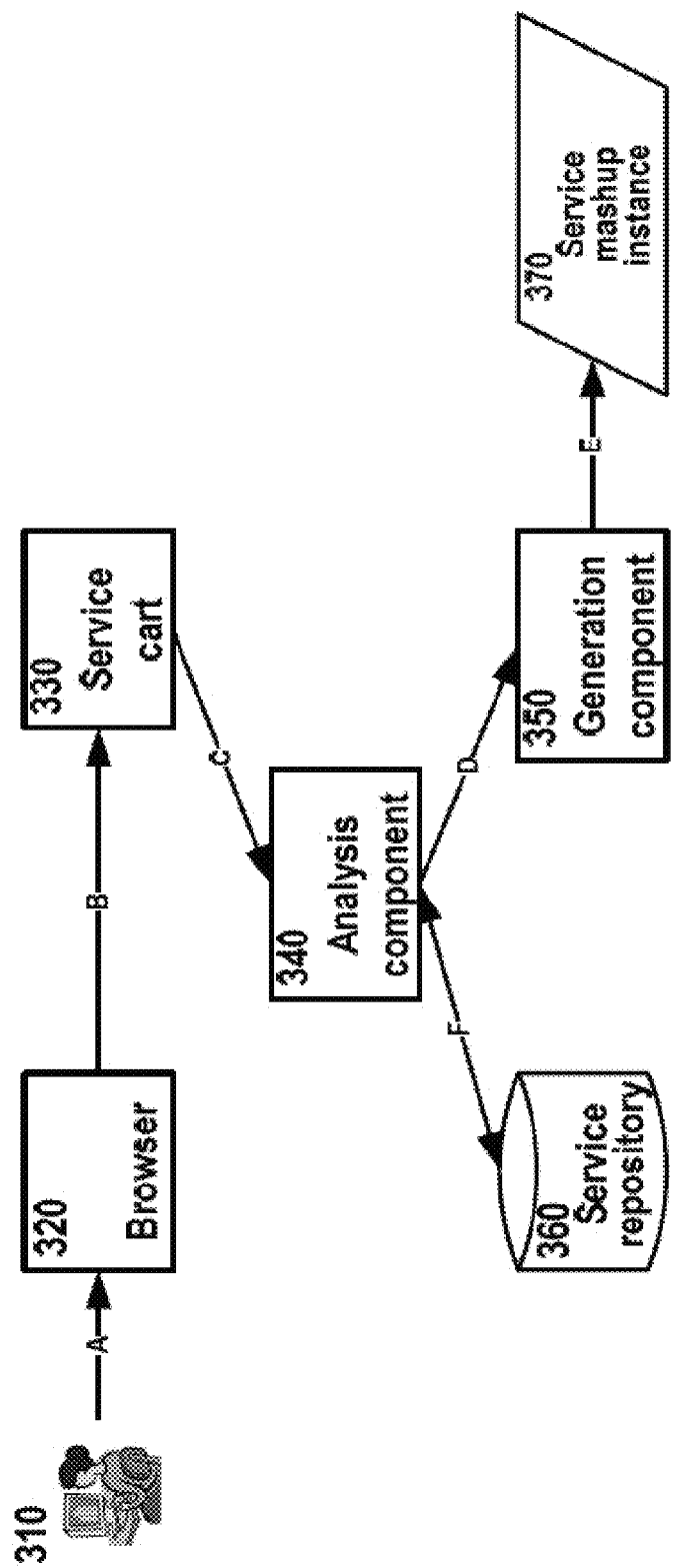
FIG. 3 is a diagram of an apparatus for creating a service mashup instance, according to one exemplary embodiment of principles described herein.

FIG. 3 schematically illustrates an example of a service mashup creation apparatus according to an embodiment of the present invention. As illustrated in FIG. 3, a user (310) browses/searches a plurality of services using a browser (320) (as shown by arrow A in FIG. 3). The browser in the various embodiments of the present application need not necessarily be a traditional web page browser but may be a special browser for Web service browsing/searching as provided according to the embodiments of the present invention. The browser (320) provides the user with an interface for browsing services, so that the user may browse services as provided to the public by Web service providers, like using an ordinary browser. Moreover, the user may search various services like using a search engine; for example, the user may input the keyword "weather" to search services related to weather. In addition, the browser (320) provides the user with various commonly-used recommendation services, e.g., for recommending book services such as GOOGLE BOOK®, AMAZON BOOK®, and DOUBAN BOOK® to keen readers and for recommending various stock services to stock investors.

Subsequently, the browser (320) parses the user's browse/search request and records the user's navigation history through various services and information related to the services (e.g., metadata) in order to form a navigation path. In addition, the user may select his/her desired services from these accessed services and save them to a service cart (330) (as shown by arrow B). According to the embodiments of the present invention the service cart (330) may be implemented as a portion of the browser (320). The present invention is not intended to emphasize that the recording function is performed at one or more components, so long as the function of recording can be performed with respect to at least two services as selected by the user during an exploration procedure.

Next, as shown by arrow C, an analysis component (340) receives from the service cart (330) at least two service selected by the user and analyzes the relationship between the at least two services. According to an embodiment of the present invention, the analysis component (340) may analyze the relationship directly based on the connection relationship in the navigation path or on metadata of the services. As shown by arrow D, the relationship obtained from analysis is outputted to a generation component (350). Further, the analysis component (340) may provide the relationship to the generation component (350) in other ways. The generation component (350) then selects a corresponding template based on the relationship and generates the service mashup instance (370) based on the template (as shown by arrow E).

For example, in the embodiment of FIG. 3, the service mashup creation apparatus further includes a service repository (360) where the pre-generated relationship between at least two services is stored. While analyzing the relationship, it is possible to retrieve from the service repository (360) the pre-stored relationship (as shown by arrow F) thereby making the analysis with respect to the originally collected navigation path unnecessary.

According to an embodiment of the present invention, relationships among some services may be pre-stored during an initialization phase. That is, a method according to the present invention may include an initialization phase where the system administrator may analyze relationships among services existing on the Internet that can be mashed up and store obtained relationships in the service repository (360). Furthermore, the user's navigation path and metadata related to various services may be stored in the service repository (360).

The relationship may be dynamically stored to the service repository (360) each time the user uses the method according to the present invention. That is, after the user's exploration procedure, the method will analyze the relationship among at least two services that the user has selected, and store the analysis result to the service repository (360) for direct retrieving in a subsequent exploration procedure. With respect to the user's next exploration procedure, the relationship obtained from analysis during the current exploration procedure and stored to the service repository (360) may be regarded as a pre-stored relationship.

Figure 5:
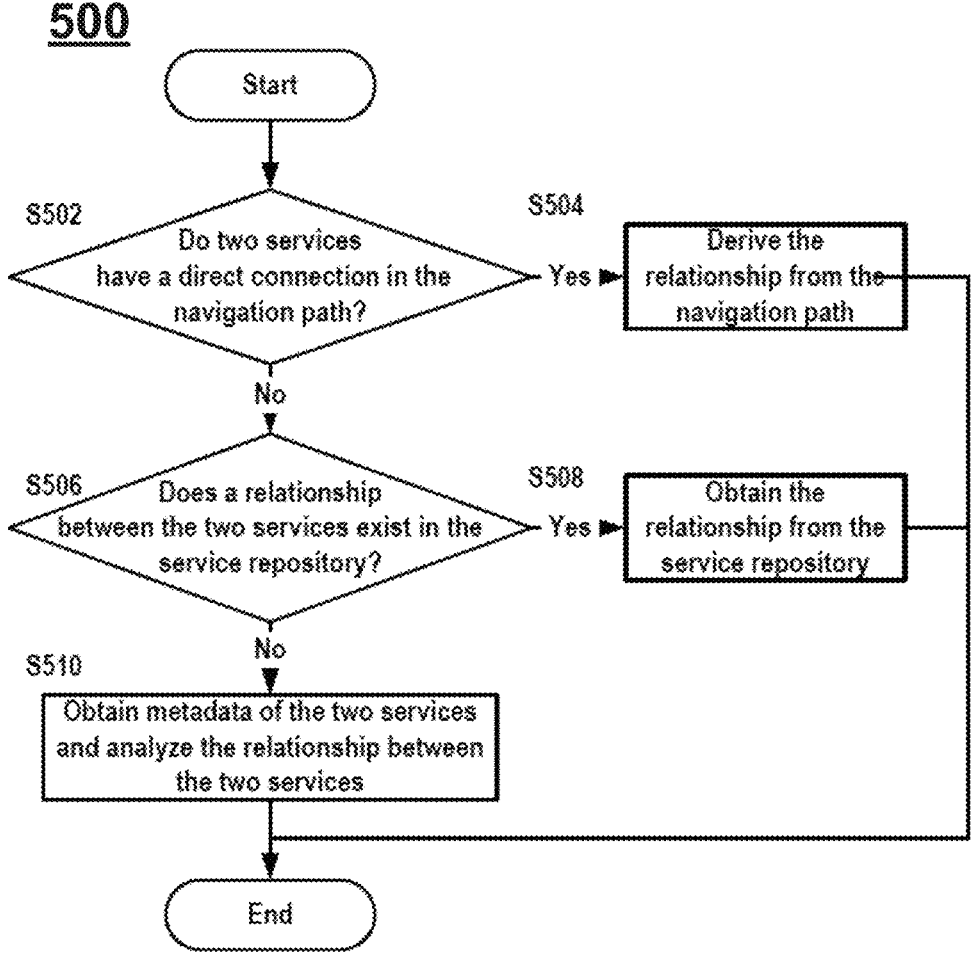
FIG. 5 is a flowchart showing an illustrative method of analyzing the relationship between two services, according to one exemplary embodiment of principles described herein.

Referring to FIG. 5, detailed description is presented below for the procedure of analyzing the relationship. According to the embodiments of the present invention, it is possible to provide different service repositories, such as DOUBAN BOOK® search, weather inquiry, food facilities search, amongst others, to user groups with different backgrounds. Different users may further build private service repositories according to their own needs.

In FIG. 3, the two-way arrow F represents a bi-direction data transmission procedure. Therefore, the direction from the analysis component (340) towards the service repository (360) represents that the analysis component (340) may submit a requests to the service repository (360). Additionally, the two-way arrow F may further represent that the analysis component (340) dynamically stores to the service repository (360) a relationship obtained from analysis of the services analyzed. In addition, the arrow pointing from the service repository (360) towards the analysis component (340) may represent that a retrieve result, such as a "found relationship" or some prompt indicating no corresponding relationship has been found, is returned to the analysis component (340).

Figure 4:
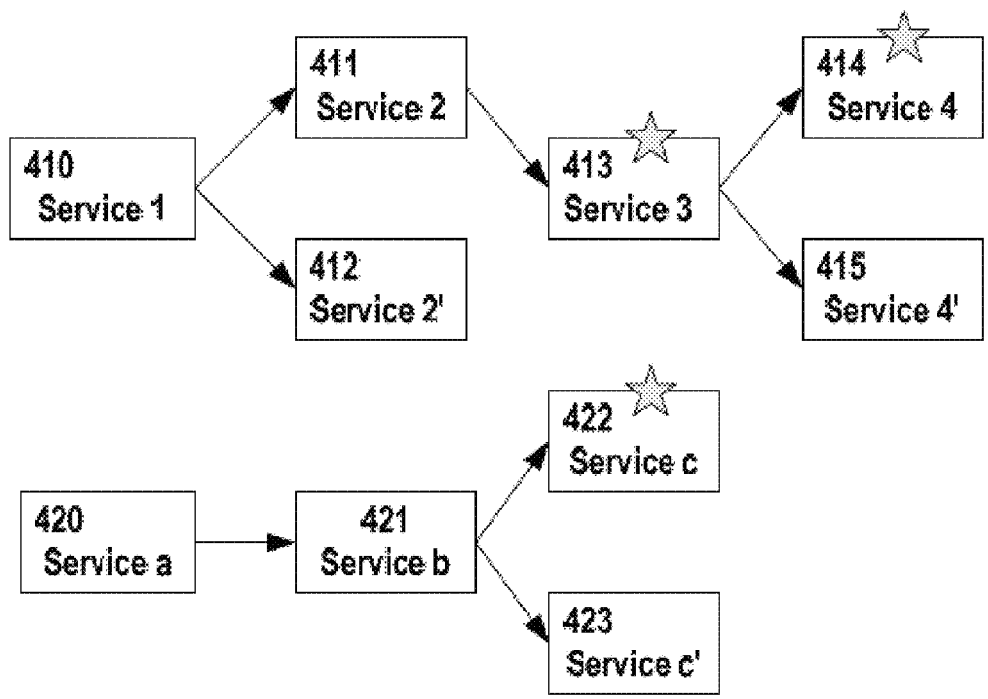
FIG. 4 is a schematic illustration of a user navigation path and services selected for a mashup, according to one exemplary embodiment of the principles described herein.

Hereinafter, with reference to FIG. 4, detailed description is presented for the procedure of how to record the navigation path and the at least two services selected. FIG. 4 schematically illustrates a data structure of the selected services and the navigation path during an exploration procedure. The data structure may be implemented in a tree diagram or other forms. However, the different data structure and ways of storing the navigation path do not constitute restrictions to the present invention.

The user may implement multiple methods to access a first service in the navigation path, for example, finding a desired service by recommended services (e.g., clicking on the recommended service "GOOGLE BOOK®" in the initial page of a browser) or by the search service provided by a browser (e.g., inputting "GOOGLE BOOK®" into the search keyword).

For example, the user starts with service 1 (410) to browse/search services and then transfers from service 1

(410) to service 2 (411) and service 2' (412) respectively. According to the embodiments of the present invention, there may exist various ways of transferring from a service to another service. Examples are presented as below.

One example is a "Recommended Menu" function. The user may transfer from a service to another service by using a Recommended Menu. For example, the user finds the search service (named a first service in this example) of GOOGLE BOOK® by the "search" function provided by the browser and inputs the keyword "HARRY POTTER,"® at which point information on multiple books related to the book title will be returned. Then, the "Recommended Menu" may be provided to supply recommended services of other services related to "HARRY POTTER"®.

For example, the "Recommended Menu" may pop up at the side of author "J. K Rowling." Because "J. K Rowling" is the name of one author, a service (named a second service in this example) defined in the Recommended Menu may be a book search service provided by other service providers, such as DOUBAN BOOK® search service and AMAZON BOOK® search service. The user then clicks on the corresponding service in the Recommended Menu and thus achieves a transfer from the first service to the second service.

Another example is a "More Search" function. The user may search for a service by the "More Search" function and transfer to another service. For example, if a user who is currently using the GOOGLE BOOK® service does not find the desired DOUBAN BOOK® service in the Recommended Menu, then the user may use the "More Search" function. That is, user may input "DOUBAN BOOK® search" into the keyword input field of "More Search" and thus achieves a transfer from the first service "GOOGLE BOOK® service" to the second service "DOUBAN BOOK® service."

According to one embodiment of the present invention, the foregoing example describing the "Recommended Menu" may have a function of self-learning. When the user finds a new service by "More Search," the user may add this new service to the "Recommended Menu." That is, the "Recommended Menu" may learn search habits of users and refine the function of the "Recommended Menu" iteratively. According to an embodiment of the present invention, the user may share his or her own "Recommended Menu" with other users.

According to the embodiments of the present invention, the user may further use the "forward/back" operation so as to transfer between the current service, a previous service, and a next service. By using the two ways as described in the foregoing "Recommended Menu" example and the "More Search" example, the user can find a desired service conveniently and quickly. Afterwards, the user may select a service expected for mashup. For example, by using the "service cart," the user may put a desired service into the service cart, indicating that he or she has selected this service. As illustrated in FIG. 4, services each with a pentagram mark are services that the user has selected, e.g., service 3 at (413), service 4 at (414), and service c at (422), so as to be used for subsequent analysis and creation steps.

As illustrated in FIG. 4, service 3 at (413) and service 4 at (414) are in a direct connection relationship. The relationship between two services may be extracted directly from the navigation path when analyzing the relationship between them.

Hereinafter, description is presented for the flowchart of how to analyze the relationship between services with reference to FIG. 5. During the procedure of analyzing the relationship between at least two services that the user has selected, the selected at least two services may first be obtained from the navigation path. Then, the relationship between any two services of the selected at least two services may be analyzed by a method to be described below, until the relationship between any two services has been analyzed.

As illustrated in FIG. 5, the analysis procedure starts when a decision is first made as to whether or not two services have a direct connection in the navigation path (S502). If yes, the operation flow then proceeds to obtain the relationship from the navigation path (S504). In the foregoing example shown with reference to FIG. 4, service 3 at (413) and service 4 at (414) have a direct connection in the navigation path, therefore the correlation relationship (e.g., the Recommended Menu) used in a transfer from service 3 at (413) and service 4 at (414) in the navigation path is used as the relationship between the current two services. After the relationship is obtained, the operation flow of analyzing the relationship between two services then ends.

There may exist two cases when obtaining a relationship between two directly connected services from the navigation path. The first is when the user transfers from the first service to the second service by using the "Recommended Menu" described above; because a relationship between the two services has been pre-stored, the relationship may be obtained directly. The second is when the user transfers from the first service to the second service by using "More Search" described above; it is possible to obtain the relationship according to the keyword inputted by the user for searching for the second service and other related context information. For example, if the first service is the GOOGLE BOOK® search and the keyword that the user has input into "More Search" is "DOUBAN BOOK® search," then it can be decided from the context that both services are book search services. Additionally, because both customer keywords are "book title," it can be determined that the two services are in a "Parameters sameAs" relationship.

If two services do not have a direct connection in the navigation path (NO decision, S502), the operation procedure then proceeds to judge whether or not a relationship between the two services exist in the service repository (S506). If yes, the flow then proceeds to obtain the relationship from the service repository (S508). As described above, relationships in the service repository may be pre-stored at the initialization phase or dynamically added each time the user generates a service mashup instance. After the relationship is obtained, the operation flow of analyzing a relationship between two services then ends.

If a relationship between the two services does not exist in the service repository, (NO decision, S506), the operation flow then proceeds by obtaining metadata of the two services and analyzing the relationship between the two services (S510). At this point, if two current services have no direct connection in the navigation path (NO decision, S502) or the service repository did not pre-store a relationship between the two services (NO decision, S506), then it is necessary to obtain metadata of the current two services from the service repository and analyze the relationship by comparing a corresponding relationship among the metadata (S510). As described above, metadata of services are recorded while services accessed and services selected by the user are recorded. One of the purposes for recording metadata of services during recording is to analyze a relationship among services. Metadata may be stored in the service repository along with the navigation path or stored in other components. For example, metadata may be used as a portion of the navigation path and as data received during analysis.

During the analysis of a relationship between two services by using metadata of the two services (S510), it is possible to make analysis by using information included metadata such as names of services, general function description of services, provided data of services, customer data of services and so on. Illustrative detailed explanations and embodiments are presented below.

The following two examples show the "Data Correlation" relationship. Those skilled in the art would associate other examples by combining the following examples.

In a first example, a user selects Service 3 (DOUBAN BOOK® search service) and Service 4 (DOUBAN BOOK® Comments service). Metadata of the two services are schematically illustrated in Table 2 and Table 3.

TABLE 2

| Service 3 | |
| --- | --- |
| Name of Service | DOUBAN BOOK ® Search |
| Customer Parameters | Title of Book |
| Provided Data | Book Number |
| | Price, etc. |

TABLE 3

| Service 4 | |
| --- | --- |
| Name of Service | DOUBAN BOOK ® Comments |
| Customer Parameters | Book Number |
| Provided Data | Comments |

As known from analysis, customer data "Book Number" in service 4 is provided data of service 3, so a relationship between service 3 and service 4 may be defined as a "Data Correlation" relationship.

In a second example, a user selects Service 5 (client information service) and Service 6 (stock quote service). Metadata of the two services are schematically illustrated in Table 4 and Table 5.

TABLE 4

| Service 5 | |
| --- | --- |
| Name of Service | Client Information |
| Customer Parameters | Name of Client |
| Provided Data | Stock Code |

TABLE 5

| Service 6 | |
| --- | --- |
| Name of Service | Stock Quote |
| Customer Parameters | Stock Code |
| Provided Data | Stock Quote Curve |

As known from analysis, customer data "Stock Code" in Service 6 is provided data "Stock Code" of Service 5, so a relationship between Service 5 and Service 6 may be defined as a "Data Correlation" relationship.

The following two examples show the "Parameters sameAs" relationship. Those skilled in the art would associate other examples.

In the first example, a user selects Service 7 (GOOGLE BOOK® search service) and Service 8 (DOUBAN BOOK® search service). Metadata of the two services are schematically illustrated in Table 6 and Table 7.

TABLE 6

| Service 7 | |
| --- | --- |
| Name of Service | GOOGLE BOOK ® Search |
| Customer Parameters | Title of Book |
| Provided Data | Basic Information of Book |

TABLE 7

| Service 8 | |
| --- | --- |
| Name of Service | DOUBAN BOOK ® Search |
| Customer Parameters | Book Number |
| Provided Data | Basic Information of Book |

As known from analysis, provided data "Basic Information of Book" in Service 7 is the same as the provided data "Basic Information of Book" in Service 8, so a relationship between Service 7 and Service 8 may be defined as a "Parameters sameAs" relationship.

In the second example, a user selects Service 5 (client information service) which is the same as the foregoing Table 4 and Table 5, and Service 9 (timeline service, that is, a service taking Name of Client as the input keyword and returning significant events within a specific time period for the client). Metadata of the two services are schematically illustrated in Table 8 and Table 9.

TABLE 8

| Service 5 | |
| --- | --- |
| Name of Service | Client Information Inquiry |
| Customer Parameters | Name of Client |
| Provided Data | Client Basic Information |

TABLE 9

| Service 9 | |
| --- | --- |
| Name of Service | Client Timeline Inquiry |
| Customer Parameters | Name of Client |
| Provided Data | Significant Events Within a Specific Time Period for Client |

As known from analysis, customer parameter "Name of Client" in Service 5 is the same as the customer parameter "Name of Client" in Service 9, so a relationship between Service and Service 9 may be defined as a "Parameters sameAs" relationship.

Returning back to FIG. 5, the process (for example, steps S504, S508 and S510) as illustrated provides three respective methods for analyzing a relationship between two services. When selecting one of the three methods to be performed first, the present invention is not limited to the order as illustrated in FIG. 5, and the three methods may be performed in other orders according to different configurations. For example, the operation of step S506 may be first performed, i.e., a relationship in the service repository is defined as the highest priority. If no relationship is pre-stored in the service repository, step S502 may then be performed to determine whether two services have a direct connection in the navigation path. Alternatively, the relationship is directly obtained by analyzing metadata of the two services at the initialization phase where the service repository is empty. The user or the administrator may make configurations in accordance with the requirements of specific circumstances.

It should be further noted that after the relationship between current services is obtained from analysis, the relationship may be stored in the service repository for subsequent use. Alternatively or additionally, an old, sub-optimal relationship in the service repository may be replaced by a new, optimal relationship. The user or the administrator may manually update the service repository (i.e., such as add, delete and modify operations to a traditional database), create a private service repository according to the user's own needs, or share the service repository with other users or servers over a network.

Figure 6A:
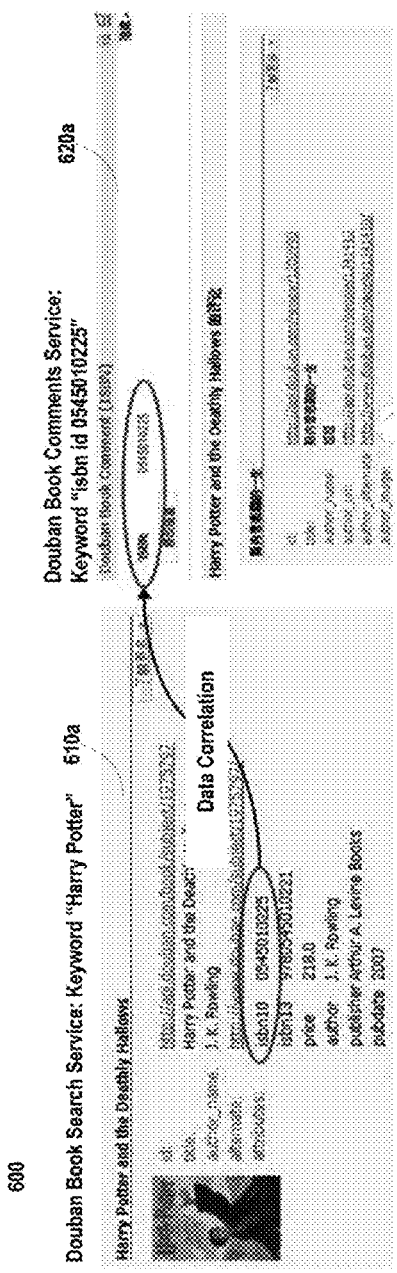
FIGS. 6A and 6B are schematic illustrations of relationships between two services, according to one exemplary embodiment of principles described herein.
Figure 6B:
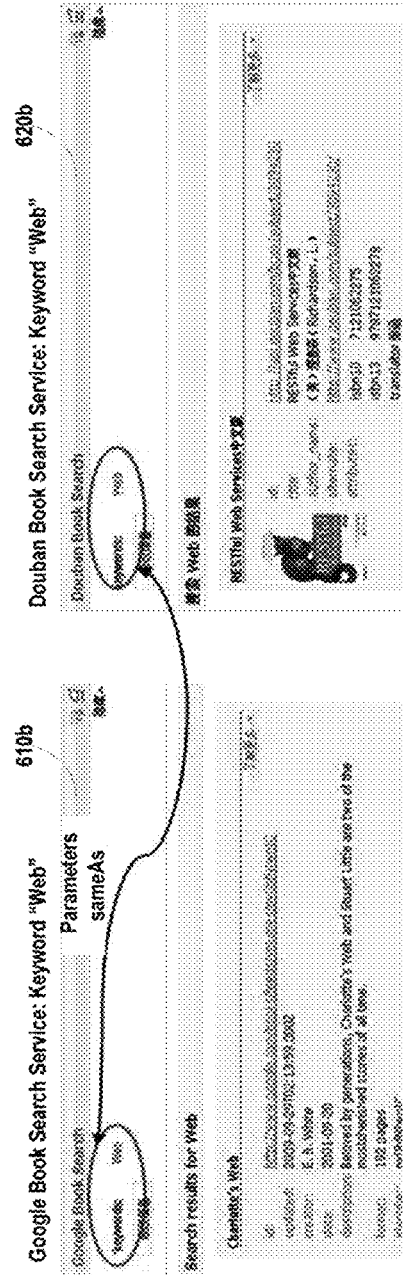

FIGS. 6A and 6B illustrate two respective services, one having a "Data Correlation" relationship and the other having a "Parameters sameAs" relationship, as well as interfaces of service mashup instances respectively formed by selecting a "Data Correlation" template and a "Parameters sameAs" template based on these two relationships. FIG. 6A illustrates examples of two service interfaces related to the foregoing Table 2 and Table 3. An interface (610*a*) is an interface of a DOUBAN BOOK® search service. Customer data of the service is the book title "HARRY POTTER,"® and provided data includes the book number "0545010225." An interface (620*a*) is an interface of a DOUBAN BOOK® comments service. The customer data is the book number "0545010225" and provided data may include comments regarding the book. Provided data of the search service may include customer data of the comments service (as shown by an arrow in FIG. 6A). Therefore, a "Data Correlation" relationship may be established between these two services, and a corresponding "Data Correlation" template may be selected to generate a service mashup instance during a subsequent generation procedure.

An interface of the generated service mashup instance is similar to the depiction in FIG. 6A. That is, interfaces of the two services (610*a*) and (610*b*) are displayed at the interface of the service mashup instance. For example, they may be displayed by means of equally dividing the layout on the right and left as illustrated in FIG. 6A or displayed in any sizes and at any positions according to the user's needs. In the service mashup instance, interfaces for two services are no longer independent, unrelated pages but are related to each other. For example, when the user inputs the Chinese name of "HARRY POTTER"® as a new book title into the search box of the service (610*a*), the book number, e.g., "1234567," of the Chinese version of the book "HARRY POTTER"® will be displayed at the position "Book Number"; the book number "1234567" is used as customer data at the service (620*a*), and comments on the Chinese version of the book "HARRY POTTER"® are output at the interface.

Regarding the examples of Table 4 and Table 5, the relationship between the two services is also a "Data Correlation" relationship. Hence, a "Data Correlation" template may also be selected, and interfaces for two services, namely stock code inquiry and stock quote, are displayed in the service mashup instance, e.g., equally dividing the layout on the right and left.

FIG. 6B illustrates examples of two service interfaces related to Table 6 and Table 7. An interface (610*b*) is an interface for a GOOGLE BOOK® search service. A customer parameter (i.e., an input keyword) of the service is the book title "Web," and provided data may include various basic information about the book. An interface (620*b*) is an interface for a DOUBAN BOOK® search service, whereas a customer parameter (i.e. an input keyword) is also the book title "Web" and provided data includes various basic information of the book. At this point, customer data of the two search services are the same as each other (as shown by an arrow in FIG. 6B). Hence, a "Parameters sameAs" relationship may be established between the two search services, and a corresponding "Parameters sameAs" template may be selected to generate a service mashup instance during a subsequent generation procedure.

Interfaces for service mashup instances generated for the two services of Table 6 and Table 7 may also be displayed by means of equally dividing the layout on the right and left, just like in FIG. 6B, or they may be displayed in other layouts according to user configurations. After a "Parameters sameAs" template is employed and when the user changes the input keyword in a service, provided data of the two services change as well and book information related to the changed keyword is displayed.

The procedure of creating a service mashup instance by selecting a template based on the relationship between the two services of Table 8 and Table 9 is similar to what is illustrated in FIG. 6B, and details thereof are thus omitted.

Figure 7:
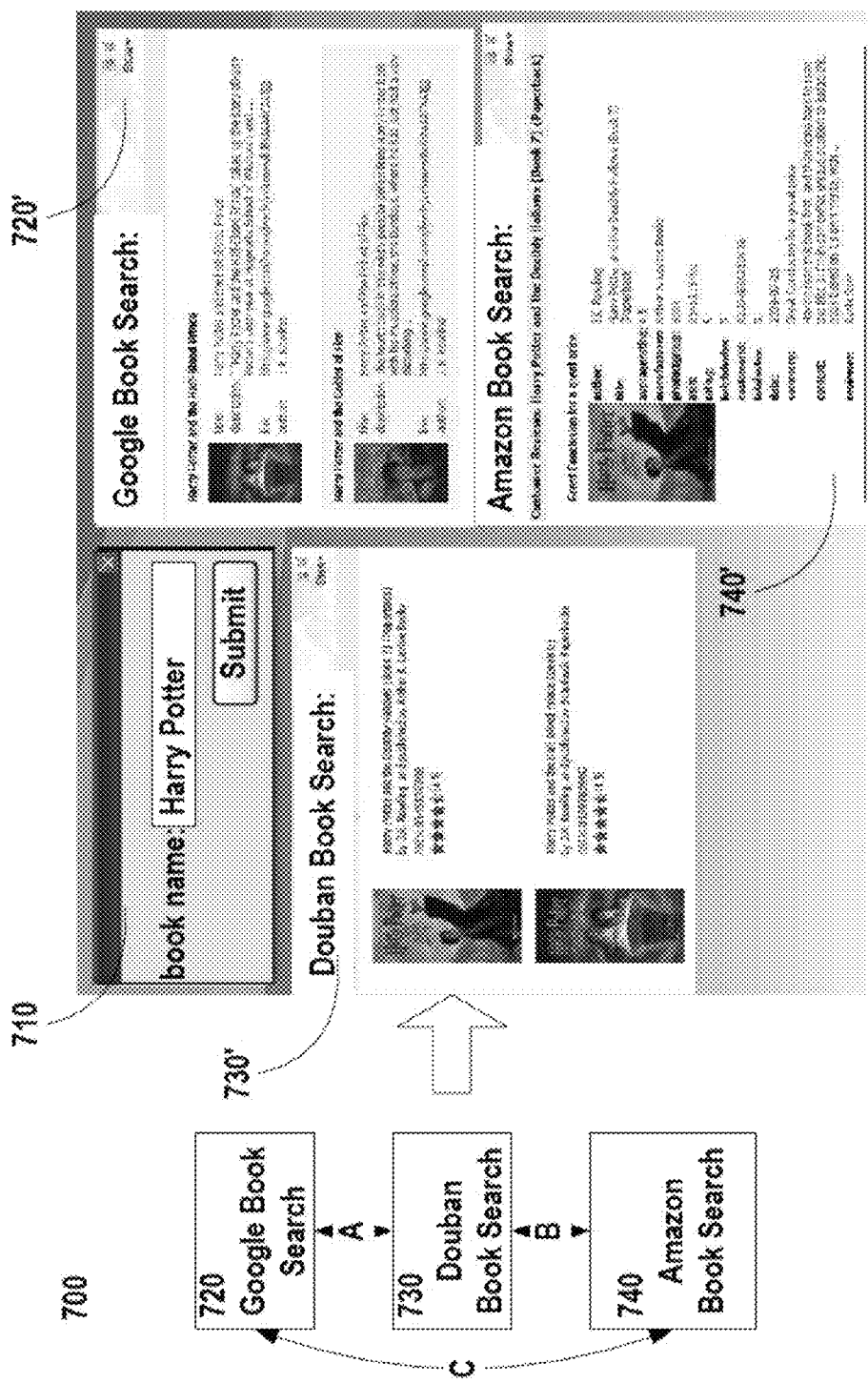
FIG. 7 is a schematic illustration of generating a service mashup instance by using a "Parameters sameAs" template, according to one exemplary embodiment of principles described herein.
Figure 8:
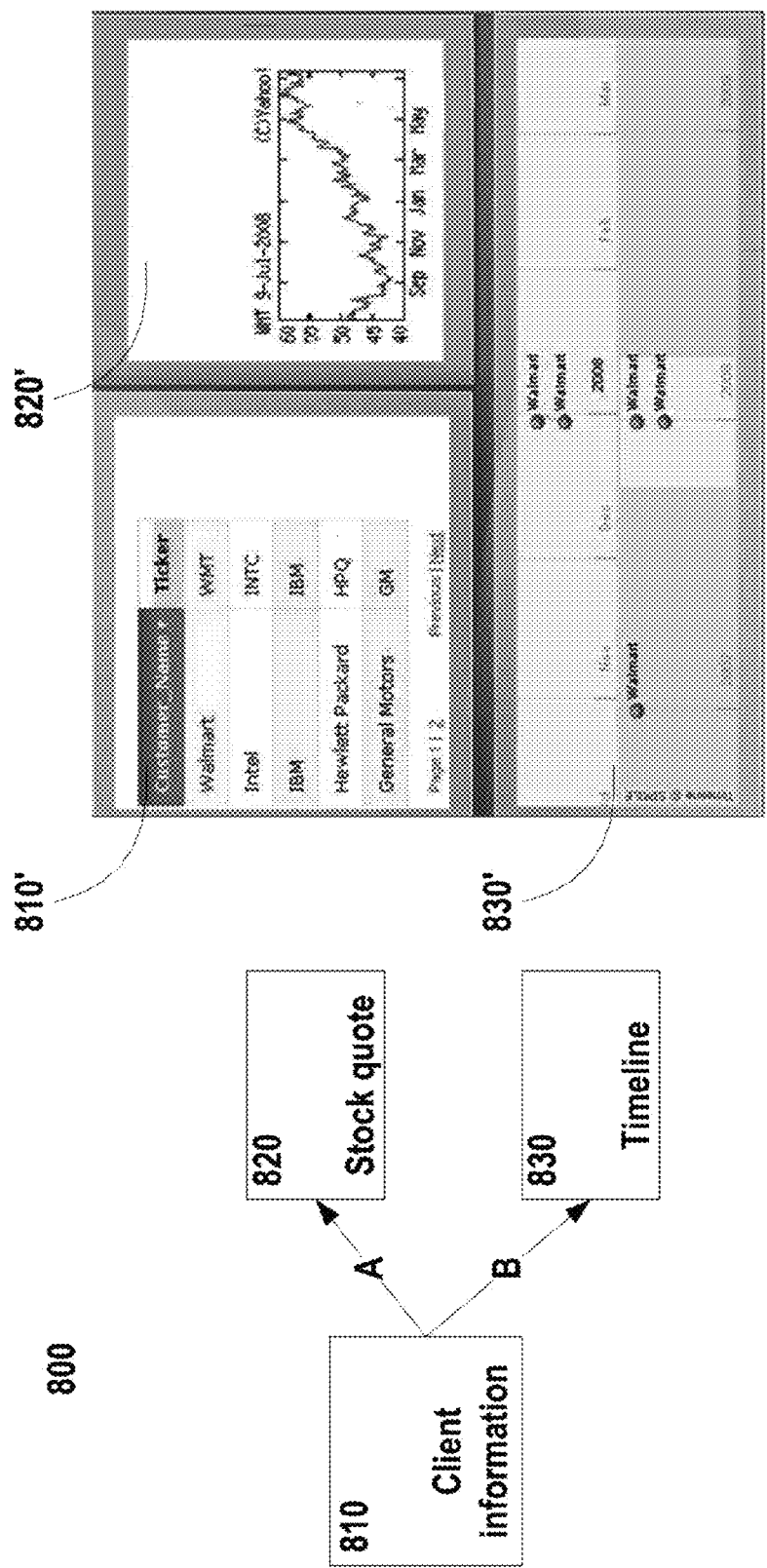
FIG. 8 is a schematic illustration of generating a service mashup instance by using a "Data Correlation" template and a "Parameters sameAs" template according to one exemplary embodiment of principles described herein.

Detailed description has been presented above for the procedure of analyzing a relationship between two services, selecting a template based on the relationship and generating a service mashup instance with reference to FIGS. 6A and 6B by way of Tables 2-9. However, users may select three or even more services to create a mashup instance in everyday use. Hereinafter, with reference to FIGS. 7 and 8, illustration is presented for the procedure and result of using the three services to create a mashup instance. Those skilled in the art would readily achieve using more services to create a service mashup instance by analyzing a method for creating a service mashup instance from two or three services.

As illustrated on the left side of FIG. 7, three services the user has selected are a GOOGLE BOOK® search service (720), a DOUBAN BOOK® search service (730) and an AMAZON BOOK® search service (740), respectively. With regard to the three services, the customer data is a book title the user has inputted, and the provided data is the book information related to the book title that the user has inputted. At this point, the relationship between the GOOGLE BOOK® search service (720) and the DOUBAN BOOK® search service (730) (as shown by arrow A in FIG. 7) is a "Parameters sameAs" relationship. Likewise, other relationships among the three services (as shown by arrows B and C in the figure) are also a "Parameters sameAs" relationship.

In the service mashup instance illustrated in FIG. 7, a "Parameters sameAs" template is employed for the three services. In this illustrative example, the customer data of the three services is the same as one another. In the generated service mashup instance, the user only needs to input a book title into a dialog box (710), information on the related book may be displayed in three service pages. Among them, an interface (720') corresponds to the GOOGLE BOOK® search service (720), an interface (730') corresponds to the DOUBAN BOOK® search service (730), and an interface (740') corresponds to the AMAZON BOOK® search service (740). When the user inputs the book title "HARRY POTTER"® into the dialog box (710), information on the book "HARRY POTTER"® is simultaneously provided in interfaces for the three services. When the user changes the book title to the Chinese name of "HARRY POTTER"® in the dialog box shown in the block diagram (710), information on the Chinese book "HARRY POTTER"® is simultaneously displayed in interfaces for the three services.

Referring to FIG. 8, examples are presented below for creating a service mashup instance by respectively using a "Data Correlation" relationship and a "Parameters sameAs" template for the three services. As illustrated in FIG. 8, three exemplary services that the user has selected are a client information service (810), a stock quote service (820), and a timeline service (830). As described above, the relationship between the client information service (810) and the stock quote service (820) is a "Data Correlation" relationship (as shown by arrow A), and a "Data Correlation" template is selected for the two services. The relationship between the client information service (810) and the timeline service (830) is a "Parameters sameAs" relationship (as shown by arrow B; that is, both services use client information as an input), and a "Parameters sameAs" template is selected for the service (810) and the service (830).

A service mashup instance generated is shown in the right interface of FIG. 8, wherein an interface (810') corresponds to the client information service (810); an interface (820') corresponds to the stock quote (820), and an interface (830') corresponds to the timeline service (830). When the user selects a client name in the interface (810') of the service mashup instance, a stock quote curve corresponding to the client name is displayed in the stock quote interface (820'), and significant events along a specific timeline for the client are displayed in the timeline interface (830') of the lower portion. When the user selects another client name in the interface (810'), information related to the newly selected client name is displayed in the other two interfaces (820') and (830'). That is, information in the three service interfaces is displayed in interrelation to each other.

According to the embodiments of the present invention, the user may not only select to display multiple services in the service mashup instance in various layouts, but may also display them in an overlay manner. For example, the user may select a map service of China and further a weather forecast service. After a relationship is established between the two services, a weather forecast of each city may be overlappingly displayed at a corresponding position on the map of China. Additionally, according to the embodiments of the present invention, the user may re-typeset provided data of each service so as to display them in a specific manner.

Still further, according to the embodiments of the present invention, refining the service repository may be an iterative and updated procedure. Each time a relationship is obtained from analysis between two services that is not yet stored in the service repository, the new relationship may be added to the service repository. Additionally or alternatively, an old relationship may be replaced by the new relationship, so as to continuously enrich content of the service repository during daily usage.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, that comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention can be embodied in full hardware, full software, or a form comprising both hardware components and software components. In an embodiment, the present system method and computer product is implemented as software, including, without limitation to, firmware, resident software, micro-code, etc.

Moreover, the present invention may be implemented as a computer program product usable from computers or accessible by computer-readable media that provide program code for use by or in connection with a computer or any instruction executing system. For the purpose of description, a computer-usable or computer-readable medium may be any tangible means that can contain, store, communicate, propagate, or transport the program for use by or in connection with an instruction execution system, apparatus, or device.

The medium may be an electric, magnetic, optical, electromagnetic, infrared, or semiconductor system (apparatus or device), or propagation medium. Examples of the computer-readable medium would include the following: a semiconductor or solid storage device, a magnetic tape, a portable computer diskette, a random access memory (RAM), a read-only memory (ROM), a hard disk, and an optical disk. Examples of the current optical disk include a compact disk read-only memory (CD-ROM), compact disk-read/write (CR-ROM), and DVD.

A data processing system adapted for storing or executing program code would include at least one processor that is coupled to a memory element directly or via a system bus. The memory element may include a local memory usable during actually executing the program code, a mass memory, and a cache that provides temporary storage for at least one portion of program code so as to decrease the number of times for retrieving code from the mass memory during execution.

An Input/Output or I/O device (including, without limitation to, a keyboard, a display, a pointing device, etc.) may be coupled to the system directly or via an intermediate I/O controller.

A network adapter may also be coupled to the system such that the data processing system can be coupled to other data processing systems, remote printers or storage devices via an intermediate private or public network. A modem, a cable modem, and an Ethernet card are merely examples of a currently usable network adapter.

It is to be understood from the foregoing description that modifications and alterations may be made to the respective embodiments of the present invention without departing from the true spirit of the present invention. The description in the present specification is intended to be illustrative and not limiting. The scope of the present invention is limited by the appended claims only.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method for creating a service mashup instance, comprising: recording at least two services being selected by a user of a computing device during an exploration procedure;
    obtaining a relationship between the at least two services; and
    generating the service mashup instance on the computing device based on the relationship;
    wherein obtaining the relationship between the at least two services comprises determining whether, based on the exploration procedure, the at least two services have a direct connection in a navigation path; and, if so, obtaining the relationship from the direct connection in the navigation path; and
    wherein obtaining a relationship between the at least two services comprises retrieving the relationship from a service repository.

2. The method of claim 1, in which obtaining a relationship between the at least two services comprises analyzing metadata of the at least two services and deriving the relationship from the metadata.

3. The method of claim 1, in which the relationship comprises at least one of a "Data Correlation" relationship and a "Parameters sameAs" relationship.

4. The method of claim 3, in which the "Data Correlation" relationship comprises a data mapping relationship between the at least two services.

5. The method of claim 3, in which the "Parameters sameAs" relationship comprises a relationship indicating that customer parameters of the at least two services have the same data type.

6. The method of claim 1, in which generating the service mashup instance based on the relationship comprises:
    selecting a corresponding mashup template based on the relationship such that different templates are used for different relationships between the at least two services; and
    generating the service mashup instance based on the selected template.

7. An apparatus for creating a service mashup instance, comprising a computing device comprising:
    a browser that records at least two services being selected by a user during an exploration procedure;
    an analysis component that obtains a relationship between the at least two services; and
    a generation component that generates the service mashup instance based on the relationship;
    wherein the analysis component retrieves the relationship from a service repository associated with the analysis component.

8. The apparatus of claim 7, in which the analysis component obtains the relationship between the at least two services by analyzing metadata associated with the at least two services.

9. The apparatus of claim 7, in which the analysis component obtains the relationship between the at least two services by determining whether, based on the exploration procedure, a direct connection exists between the at least two services.

10. The apparatus of claim 7, in which the relationship comprises at least one of a "Data Correlation" relationship and a "Parameters sameAs" relationship.

11. The apparatus of claim 10, in which the "Data Correlation" relationship comprises a data mapping relationship between the at least two services.

12. The apparatus of claim 10, in which the "Parameters sameAs" relationship comprises a relationship indicating that customer parameters of the at least two services have the same data type.

13. The apparatus of claim 7, in which the generation component:
    selects a corresponding template based on the relationship; and
    generates the service mashup instance based on the template.

* * * * *